United States Patent Office 2,949,011
Patented Aug. 16, 1960

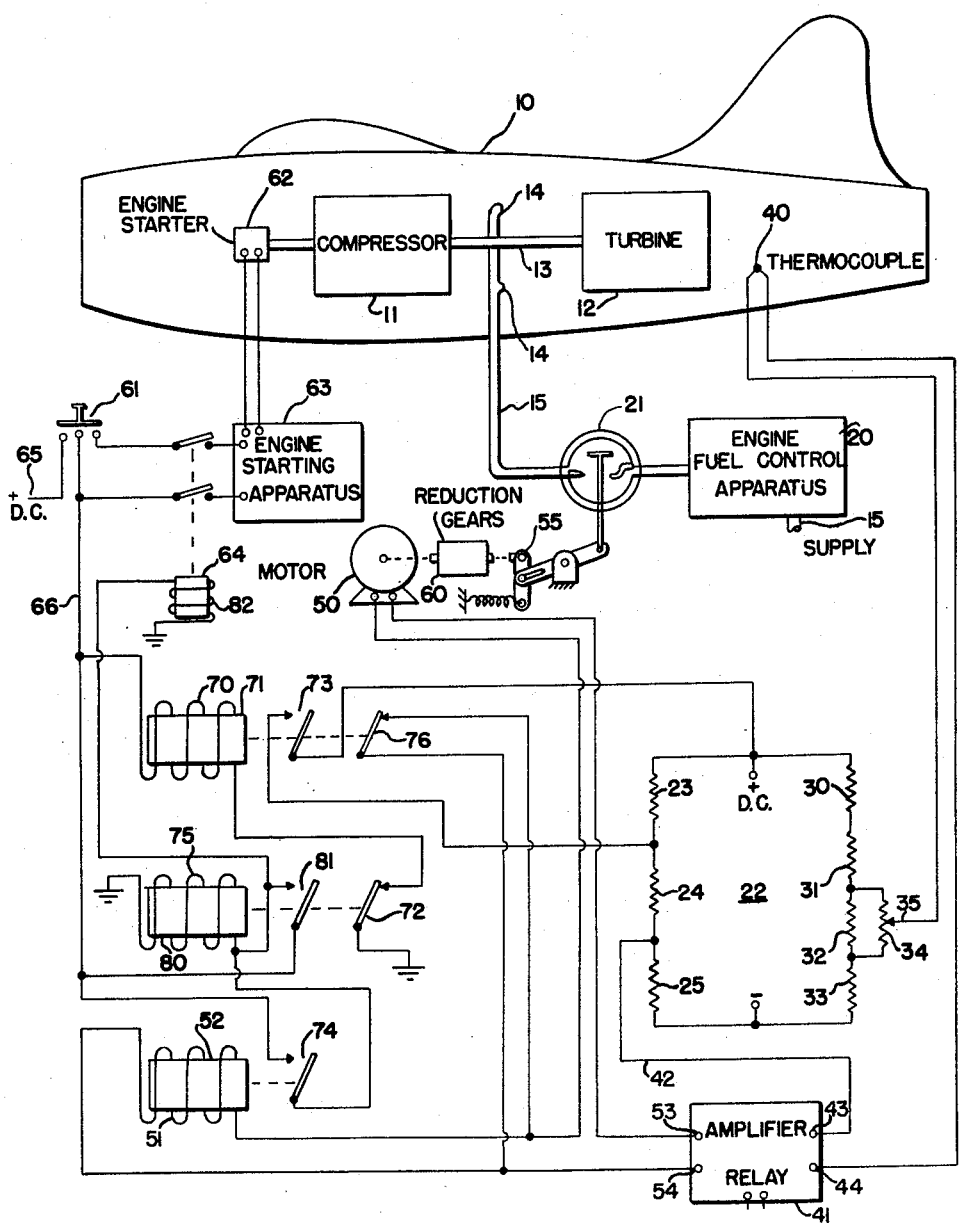

2,949,011

CHECKING MEANS FOR TEMPERATURE LIMITER AT START OF ENGINE

John W. Bancroft, Minneapolis, Minn., assignor to Minneapolis-Honeywell Regulator Company, Minneapolis, Minn., a corporation of Delaware Filed Aug. 29, 1955, Ser. No. 531,149

5 Claims. (Cl. 60—39.09)

The present invention is concerned with engine control apparatus, more particularly with apparatus for checking engine temperature limiting apparatus prior to beginning engine operation.

In the present day gas turbine engines maximum efficiency and power output is more often obtained when the operating temperature of the engine is as high as possible; however, such operating temperature is limited by the maximum temperature the engine and associated components of the aircraft will withstand. While normally there is a fuel control apparatus for controlling the fuel to the engine in accordance with various engine parameters such as rotor speed and engine temperature, it has been found that there is a need for an auxiliary control to limit the temperature in the engine by reducing fuel flow when such temperature approaches some predetermined maximum value.

As an excessive temperature condition in the engine can prove quite disastrous even when allowed to exist for a short time, an auxiliary temperature limiting apparatus must be in working order before the engine is started. The present invention is concerned with apparatus for checking the temperatures limiting apparatus to assure that it is in working order before engine operation is begun. Such checking is provided by modifying the temperature limiting apparatus to simulate an over-temperature condition and upon associated apparatus responding in a proper manner to this over-temperature condition the engine starting apparatus can be initiated.

It is therefore an object of the present invention to provide apparatus for checking one engine condition controlling means prior to the energization of an engine condition changing means.

Another object of the present invention is to simulate an undesired output from an engine condition control apparatus and upon a proper response to the simulated condition a second apparatus associated with engine operation is energized.

Still another object of the present invention is to provide in a gas turbine engine control system a means of checking a temperature limiting network by simulating an over-temperature condition and upon the proper response to the simulated over-temperature condition engine starting apparatus is energized.

These and other objects of the present invention will become apparent upon a consideration of the specification and claims and drawings of which the single figure is a schematic diagram of the invention as it is applied to a gas turbine engine.

Referring to the figure, aircraft 10 is shown having a compressor 11 and a turbine 12 interconnected by a shaft 13. Fuel is supplied to nozzles 14 from a supply through engine fuel control apparatus 20, a valve 21, and conduit 15 connected in series. The engine fuel control apparatus is of a conventional type for controlling the fuel supply to the burners as a function of engine parameters such as speed, combustion chamber temperature, and inlet conditions such as air temperature and pressure.

The temperature limiting apparatus comprises a bridge cicuit 22 having a first and second parallel branch connected to a source of D.C. voltage. The first branch comprises resistors 23, 24, and 25 and the second branch comprises resistors 30, 31, 32, and 33. Connected in parallel with resistor 32 is a resistor 34 having a movable wiper 35 thereon used for calibration purposes. The output of bridge 22 is compared with the output of the voltage generating device or thermocouple 40. The resultant voltage obtained upon the comparison of the bridge output and the thermocouple output is applied to the input of an amplifier relay 41 by the following connection. A conductor 42 is connected between the junction of resistors 24 and 25 and a first input terminal 43 of the amplifier. Thermocouple 40 is connected between wiper 35 and a second input terminal 44 of the amplifier. Upon the proper adjustment of the resistance values of the resistors in the bridge circuit as well as the position of the wiper 35 the input voltage to the amplifier when the temperature experienced by thermocouple 40 is within safe limits has a predetermined polarity and magnitude.

Amplifier 41 has a conventional D.C. motor 50 and a winding 51 of a relay 52 connected in series to the output terminals 53 and 54. The amplifier relay is of a conventional type having a particular D.C. output upon its D.C. input reaching some predetermined magnitude and polarity. Thus normally when the temperature experienced by the thermocouple is below a selected maximum temperature neither relay 52 nor motor 50 is energized. Should the temperature in the engine become excessive and the output of the thermocouple increases, motor 50 is energized to cut down the fuel flow to nozzles 14 by closing valve 21. This is done by rotating member 55 counterclockwise, it being connected to the motor through the reduction gears 60. Upon the temperature in the engine decreasing to a safe value the motor is de-energized and by the spring return valve 21 is moved in an opening direction.

A starter switch 61 is depressed when it is desired to energize an engine starter 62 connected to shaft 13 of the engine. The conventional engine starting apparatus 63 being the prime power source for the engine starter is energized whenever relay 64 is energized to close its associated switches. The engine stating apparatus may be of any sort for causing rotation of the engine and is not a part of the present invention.

Upon the pressing of starter button 61 a D.C. power source 65 is connected to a winding 70 of a relay 71, the other end of winding 70 being connected through a normally closed switch 72 to ground. Upon energization of relay 71 its associated switch 73 closes to short out resistor 23 of bridge 22. A second switch 76 normally shunting relay winding 51 is opened when relay 71 is energized. Such an action modifies the bridge to simulate an over-temperature condition which normally is not the case when the engine is not in operation. If the temperature limiting apparatus is in proper working order this simulated over-temperature condition will produce an output from amplifier relay 41 to energize relay 52. A switch 74 is closed upon energizing relay 52 to connect conductor 66 to a winding 75 of a relay 80, the other end of winding 75 being connected to ground. Upon energization of relay 80, it closes switch 81 connected in parallel with switch 74 to act as a holding circuit for relay 80. At the same time switch 72 is opened to de-energize relay 71.

Simultaneously with the energization of relay 80, the relay 64, which has a winding 82 connected in parallel with winding 75, is energized; this closes the switches associated therewith to energize the engine starter.

*Operation*

In considering the operation of the present invention it is well to realize that normally a temperature limiting apparatus such as shown infrequently operates. It is only for unusual conditions and acts as a safety measure to prevent the destruction of the engine and aircraft should an excessive temperature exist. Normally, the fuel control is accomplished by the main fuel control apparatus which generally has a temperature responsive means in addition to other engine parameter responsive means for controlling the fuel flow. The temperature limiting apparatus is additional to the normal control and only comes into operation when an over-temperature condition exists. Such apparatus reduces the fuel flow quite rapidly so that the over-temperature condition is not present for an extensive period.

Assuming that the aircraft was on ground and it was desired to start the engine, switch button 61 would be depressed and assuming that the temperature limiting apparatus was energized, that is all sources of power turned on, relay 71 is energized to shunt resistor 23 of the bridge circuit and place relay 52 in the output circuit of amplifier relay 41 in series with motor 50. This modifies the bridge circuit so that the output as received by amplifier 41 is indicative of an over-temperature condition, the same as obtained when the thermocouple 40 experiences a temperature above some predetermined value. Such an over-temperature condition would normally shut down the fuel flow by closing valve 21; however, upon energization of relay 52, normal operation of the temperature limiting apparatus is present. If, for example, a lead wire or one of the legs of the bridge were open or grounded the input to the amplifier would not indicate an over-temperature condition and relay 52 would not be energized. Such being the case, engine starting would not take place and the operator would become aware of some defect in the temperature limiting apparatus.

Upon proper operation of the temperature limiting apparatus with the simulated over-temperature condition, switch 74 closes to energize relays 80 and 64, the latter closing the engine starting circuit. Upon energization of relay 80 switch 72 opens to de-energize relay 71 which removes the shunt from resistor 23 placing the temperature limiting apparatus back in its normal operation; however, as the holding switch 81 is closed relay 80 will remain energized and will maintain starting relay 64 energized as long as the operator continuously depresses starter button 61. With such an arrangement the temperature limiting apparatus would be placed in operation as soon as it was checked even though the engine starting apparatus was still being energized.

While the invention has been disclosed for checking a temperature limiting apparatus of a gas turbine engine prior to energization of starting apparatus, this has been done for illustrative purposes only and it is believed that other engine condition or parameter control apparatus might be checked prior to the energization of a second condition or parameter control apparatus. The invention need not be limited to only temperature limiting apparatus and engine starting; however, it is intended that the invention be limited only by the scope of the appended claims.

I claim as my invention:

1. In control apparatus for a combustion engine, the apparatus checking the operation of a temperature limiting apparatus prior to starting the engine, voltage generating means responsive to engine temperature for generating a voltage indicative of the engine temperature, a source of power for providing a comparison voltage, circuit means connecting said generating means and said source of voltage so that each is compared with the other and a resultant voltage obtained, said resultant voltage being of a first level when the temperature of the engine is normal and a second level when the temperature is excessive, amplifier relay means, means for connecting said circuit means in a controlling relation to said amplifier relay means, fuel flow control means, first relay means, connection means connecting said amplifier relay means in a manner to control said fuel flow control means and said first relay means so that upon said resultant voltage being of said second level the flow of fuel to the engine is reduced and said first relay means is energized, second relay means being energized upon the closing of an engine starting switch, circuit means associated with said second relay means for modifying said first mentioned circuit means so that upon proper operation of said first mentioned circuit means a resultant voltage of said second level is obtained regardless of the engine temperature, and means associated with said first relay means when energized for de-energizing said second relay means and connecting said starting switch in a manner to initiate the starting of the engine.

2. In an engine temperature limiting checking apparatus for an engine control means, a starter switch, engine temperature responsive means for providing an output indicative of engine temperature, circuit means connecting said temperature responsive means in controlling relation to said engine control means, additional circuit means effective upon closing the engine starter switch for modifying said first mentioned circuit means to simulate an excessive temperature condition, and relay means associated with said first mentioned circuit means connecting the starter switch in such relation to effect engine starting whenever said modified circuit means responds in a manner indicative of an excessive temperature condition.

3. In checking apparatus for an engine control means including an engine starting switch, temperature responsive means responsive to an engine temperature, circuit means for connecting said temperature responsive means in controlling relation to said engine control means, said temperature responsive means having an output adjusted to actuate said engine control means upon its sensed temperature exceeding a predetermined level, means associated with said starting switch for modifying said circuit means to simulate the existence of an engine temperature above said predetermined level so that upon proper operation of said circuit means and said temperature responsive means an overtemperature output indicative of a temperature above said predetermined level is obtained, and means responsive to said overtemperature output for connecting said switch in a manner to start the engine.

4. In an engine control system; apparatus including temperature sensing means arranged to limit a temperature in said engine; means for modifying said apparatus in a manner to simulate an excessive temperature when said sensing means is actually subject to a much lower temperature; means for starting said engine; and means connecting said starting means, said modifying means and said apparatus in such manner that said starting means is effective to start the engine only when said modifying means is simulating an excessive temperature and said apparatus responds to said simulated excessive temperature.

5. In an engine control system; apparatus including temperature sensing means arranged to control temperature in a predetermined manner in said engine; means for modifying said apparatus in such a way that said apparatus will function to control in said predetermined manner even though the temperature being sensed would not cause functioning of said apparatus; starting means for said engine; and means connecting said starting means, said apparatus and said modifying means so that said starting means is effective to start the engine only when said modified apparatus functions in said predetermined manner even though the temperature actually being sensed would not cause said apparatus to function.

References Cited in the file of this patent

UNITED STATES PATENTS

| | | |
|---|---|---|
| 2,263,430 | Wannamaker | Nov. 18, 1941 |
| 2,295,885 | Yates | Sept. 15, 1942 |
| 2,610,466 | Ballantyne et al. | Sept. 16, 1952 |
| 2,647,237 | Herbst | July 28, 1953 |
| 2,816,605 | Seville | Dec. 17, 1957 |